United States Patent Office 2,905,728
Patented Sept. 22, 1959

2,905,728
PRODUCTION OF 9,9'-BIFLUORYLIDENE

Bernard B. Lampert, Westfield, N.J., and Jay E. Meili, Pittsburgh, Pa., assignors to Union Carbide Corporation, a corporation of New York No Drawing. Application July 23, 1956
Serial No. 599,366

22 Claims. (Cl. 260—668)

This invention is related to chemical processes. More particularly, is is directed to an improved process for the production of 9,9'-bifluorylidene.

The compound 9,9'-bifluorylidene, which is generally assigned the formula:

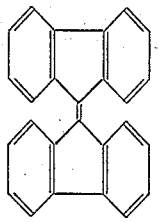

appears in the literature under a number of names other than 9,9'-bifluorylidene. Among these are bifluorenylidene, delta-9,9'-bifluorene, fluorenylidenefluorene, tetraphenyleneethylene, bifluorene, bidiphenylene ethylene and diphenyleneethylene.

A practicable method for the commercial production of 9,9'-bifluorylidene has long been sought. Prior preparations of the compound have followed various routes, including a number of syntheses from the 9-substituted halofluorene. Vanscheidt made 9,9'-bifluorylidene by the intermolecular dehydrogenation of the 9-halofluorenes (J. Russ. Phys. Chem. Soc. 47 (1915), 202–203, 758–760, and 58 (1926), 39–82, 249–306), as did Fuson and Porter (J. Amer. Chem. Soc. 70 (1948), 895–897). Other workers added methanolic caustic to a solution of 9-bromofluorene or 9-chlorofluorene (Wittig and Felletschin, Ann. 555 (1944), 133–145; Sampey and Reid, J. Amer. Chem. Soc., 69 (1947), 234–235; Hurd and Mold, J. Org. Chem. 13 (1948), 339–346). Treatment of 9-chlorofluorene with liquid ammonia was employed by Courtot and Petitcolas (Compt. rend. 180 (1925) 297), and by Pinck and Hilbert (J. Amer. Chem. Soc. 68 (1946), 377–380), to obtain 9,9'-bifluorylidene. Whitmore and Thurman (J. Amer. Chem. Soc. 51 (1929), 1495 and 1502), treated 9-bromofluorene with either mercury ditolyl or mercury diphenyl in toluene for the same result.

A number of interesting syntheses of 9,9'-bifluorylidene were done by treating 9,9'-dichlorofluorene with various reagents. For instance copper powder in benzene was used by Schmidt and Wagner (Ber. 43 (1910), 1796–1802), by Bell (J. Chem. Soc. (1952) 5047-5048), and by McClain (Dissertation (1946), Johns Hopkins University). Silver powder in xylene was the reagent used used by Norris, Thomas and Brown (Ber. 43 (1910), 2940–2959), and by Bergmann (J. Chem. Soc. (1935), 987–989), whereas Smedley used potassium sulfide and potassium hydroxide in alcohol (J. Chem. Soc. 87 (1905), 1254).

Much work has been done on obtaining 9,9'-bifluorylidene from 9,9'-bifluorenyl and its derivatives. For example, Courtot made it from 9-chloro-9,9'-bifluorenyl and pyridine (Ann. Chim. 4 (1915), 168–224), while Pinck and Hilbert used 9-bromo-9,9'-bifluorenyl and copper powder in carbon tetrachloride (J. Amer. Chem. Soc. 69 (1947), 723). The compound 9,9'-dibromo-9,9'-bifluorenyl was dehalogenated with sodium by Graebe (Ber. 25 (1892), 3146, 3149). Grignard and Courtot (Compt. rend. 152 (1911), 1493-1495), dehydrated 9-hydroxy-9,9'-bifluorenyl with hydrochloric acid in acetic acid solution to give 9,9'-bifluorylidene while Vjdelek and Protiva (Chem. Listy (Praque 45 (1951), 44–45), treated dimethyl-9,9'-bifluorenyl-ammonium bromide with phenyllithium in ether to give the free base and some 9,9'-bifluorylidene. Thermal decomposition of 9,9'-bisphenylmercapto-9,9'-bifluorenyl to give diphenyl sulfide and 9,9'-bifluorylidene was achieved by Schonberg and Stolpp (Ann. 483 (1930), 90–107), whereas 9,9'-dinitro-9,9'-bifluorenyl was heated with phenol to give 9,9'-bifluorylidene and nitrophenol by Schlenk, Racky and Bornhardt (Ann. 394 (1912), 208, 214).

Production of 9,9'-bifluorylidene by the dehydrogenation of 9,9'-bifluorenyl has been attempted by a number of workers with some success. In one method large quantities of lead oxide were employed at high temperatures (Graebe and Stindt, Ann 291 (1896), 1–8, and Goldschmidt and Reichel, Ann. 456 (1927), 152–168). Attempts to dehydrogenate the 9,9-bifluorenyl by mild oxidizing agents such as ferric chloride or hydrogen peroxide were unsuccessful. It has been reported that 9,9'-bifluorenyl is converted to 9,9'-bifluorylidene by treatment with any of the following: silver oxide in pyridine, silver nitrate with ammonium hydroxide in pyridine and iodine, air in sodium ethoxide pyridine or silver oxide and ammonium hydroxide in pyridine (Vanscheidt, Ber. (1926), 59B, 2092–2100, and J. Gen. Chem. (U.S.S.R.), 4 (1934), 875–884, and Vanscheidt and Moldavskii, Ber. 64B (1931), 917–925).

In the investigations discussed above the attempts were to make 9,9'-bifluorylidene from various derivatives of it prepared in various ways. The more commercially attractive goal of producing 9,9'-bifluorylidene has interested many investigators also. The synthesis has been achieved in a number of cases but none of these have been commercially attractive for one or more reasons. Some methods are quite complicated, with unusual catalysts prepared by involved procedures, while others use large quantities of relatively expensive catalysts. Other preparations give low yields and efficiencies. In 1875 De la Harpe and Van Dorp were the first to report the preparation of 9,9'-bifluorylidene by distilling fluorene from lead oxide (Ber. 8 (1875), 1048). Other workers later used this method to prepare samples of the compound (Klinger and Lonnes, Ber. 29 (1896), 2152–2158, and Stanek, Chem. Listy (Praque), 44 (1950), 253–255). However, Manchot and Krische reported that much biphenylene ethylene was formed when fluorene was oxidized with lead oxide. Pinck and Hilbert reported that 9,9'-bifluorylidene was obtained through a series of Michael condensations when fluorene was made to react with 2,2',7,7'-tetrabromo-9,9'-bifluorylidene (J. Amer. Chem. Soc. 68 (1946), 2014–2017). It was found by Reddelien (Ber. 53 (1920), 355–358), that both benzophenone anil and fluorenone anil were capable of dehydrogenating fluorene in the presence of an acidic catalyst at a temperature of 300° C. to give mixtures of 9,9'-bifluorenyl and 9,9'-bifluorylidene.

The oxidation of fluorene and some of its derivatives, including 9,9'-bifluorylidene, to the fluorenones, using an oxidizing gas and steam over a favorable contact mass is suggested in two U.S. patents to A. O. Jaeger, Nos. 1,868,531, issued July 26, 1932, and 1,892,768, issued January 3, 1933. The earlier patent mentions compounds of alkali metals as catalysts, or other metallic catalysts. Jaeger infers that 9,9'-bifluorylidene is produced in the course of these oxidation reactions but no examples are given. It is proposed to produce 9,9'-bifluorylidene by the dehydrogenation of fluorene using a metallic oxide or oxide catalyst, a long reaction period and high temperatures, in U.S. Patent 2,578,479, issued December 11, 1951, to R. J. S. Jennings and A. F. Williams.

The present invention is based upon our discovery that 9,9'-bifluorenyl, a compound obtained by heating fluorene with sulfur, can be converted to 9,9'-bifluorylidene by a reaction quite different from the reactions carried out in processes heretofore known, all of which employed dehydrogenation. We have discovered that upon being heated to a temperature of 245° C. or more, 9,9'-bifluorenyl will thermally disproportionate to 9,9'-bifluorylidene and fluorene. The reaction may be represented as follows:

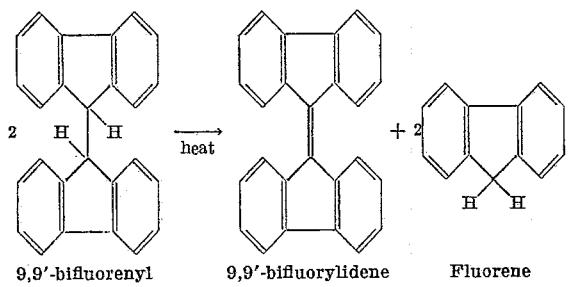

9,9'-bifluorenyl    9,9'-bifluorylidene    Fluorene

The reaction proceeds upon the application of heat alone, being a disproportionation reaction rather than a dehydrogenation reaction, and requiring no catalyst, oxidizing agent or dehydrogenation agent. The reaction is best carried out at a temperature between 320° C. and 340° C., but can be operated in the temperature range of from 310° C. to 365° C. While the disproportionation will proceed at temperatures below 300° C., the rate of reaction is so slow as to be impractical. Above a temperature of about 340° C. there is an increased tendency to resinification of the materials. We prefer a temperature about 325° C.

As the disproportionation reaction proceeds fluorene is produced as a vapor and can be collected and condensed for recycling to the process. Removal of the fluorene is facilitated by operating at a reduced pressure of from 25 to 150 mm. of mercury. In the operation of the process of the invention heating of the 9,9'-bifluorenyl is continued until fluorene is no longer evolved, an indication that the disproportionation reaction is complete.

During the disproportionation reaction, even when operating in the preferred temperature range, there is some tendency to resinification on the part of the compounds involved. This tendency to resinification can be inhibited in several ways, including operation in an inert gas atmosphere, for example nitrogen. We prefer, however, to inhibit resinification by adding to the 9,9'-bifluorenyl a small quantity of inert carbon, preferably charcoal. The inert carbon, or charcoal, is added, preferably in the amount of from 0.5 to 5 parts by weight of carbon or charcoal per 100 parts by weight of 9,9'-bifluorenyl, and the two are mixed together. During the disproportionation reaction no agitation of the mixture is necessary.

Upon completion of the disproportionation reaction, indicated by the end of the evolution of fluorene, 9,9'-bifluorylidene will remain as product in the reaction vessel. In recovering the 9,9'-bifluorylidene it is best to first remove any unreacted 9,9'-bifluorenyl and any undistilled fluorene. This may be done conveniently by slightly lowering the pressure, while maintaining the reaction temperature, which will cause these compounds to distill out of the vessel. The 9,9'-bifluorylidene can then be readily collected and recovered by raising the temperature to about 350° C. and further reducing the pressure to about 0.5 mm. of mercury.

In a preferred embodiment of our invention the 9,9'-bifluorenyl, which is disproportionated to 9,9'-bifluorylidene, is made from fluorene. This may be done by mixing fluorene with sulfur in the ratio of between 2.0 and 3.0 mols of fluorene per mol of sulfur. Between 2.40 and 2.66 mols of fluorene per mol of sulfur are preferred. This mixture is then heated at a temperature between 240° C. and 290° C. The heating is done at atmospheric pressure and agitation of the reaction mixture is unnecessary. It is desirable, however, that the sulfur and fluorene be thoroughly mixed before the heating is commenced. This reaction under the above conditions produced 9,9'-bifluorenyl in good yields, up to 85 percent, and with 80 to 90 percent efficiency. While the reaction will proceed at temperatures below 240° C., the rate of reaction is too slow for economical operation. Temperatures above 290° C. can be used but are unnecessary. We prefer a temperature of about 250° C. We have found that the process works quite well with commercial grade fluorene obtained from coal tar. If desired the fluorene from this source may be recrystalized from a suitable solvent such as acetic acid. Such treatment of the fluorene may increase slightly the yield of 9,9'-bifluorenyl but this slight improvement does not appear to be economical on a commercial scale in view of the additional cost and effort required for the recrystallization.

It is an advantage of our process that fluorene can be converted to 9,9'-bifluorylidene with only the one compound 9,9'-bifluorenyl as an intermediate. It is a further advantage that fluorence is regenerated in the process and can be recycled for reuse.

By the process of the invention it is possible to make 9,9'-bifluorylidene of greater than 80 percent purity directly from fluorene with single pass conversion of 25 percent by weight or more of the fluorene, and with an efficiency of 70 percent or more. The process is adaptable to either batch or continuous operation. As a batch operation fluorene can be converted to 9,9'-bifluorenyl and the 9,9'-bifluorenyl can be disproportionated to 9,9'-bifluorylidene in the same reactor vessel in which it was made, by raising the temperature. Apparatus for conducting the process of the invention should be such that the contents of the reaction vessel can be heated and distilled. It is to be understood of course that the process could be operated in continuous fashion, with the 9,9'-bifluorenyl produced from fluorene and conducted to another vessel for disproportionation to 9,9'-bifluorylidene. Or 9,9'-bifluorenyl, regardless of source, could be converted to 9,9'-bifluorylidene by the disproportionation process according to the invention.

*Example 1*

A mixture of 1000 grams of commercial fluorene produced from coal-tar and having a melting point temperature of 110–111° C. and 67.4 grams of sulfur was heated for 70 minutes in a flask in a liquid bath maintained at a temperature of 250° C. The hydrogen sulfide formed was trapped and removed as formed. Fifteen grams of carbon were then introduced into the reaction mixture and the mixture was distilled for 165 minutes at a temperature of 250° C. to 325° C. and under a reduced pressure of 80 mm. of mercury, using a short packed column. During this period 498 grams of fluorene having a melting point temperature of 100–108° C. were collected as distillate. The temperature of the bath was then maintained at 330° C. and the pressure was gradually reduced to 7.5 mm. of mercury over a period of 80 minutes, during which time 130 grams of distillate were collected. This distillate was composed, by weight, of 96 percent fluorene, 3 percent 9,9'-bifluorenyl and 0.8 percent 9,9'-difluorylidene. A final flash distillation was then made at a bath temperature of 350° C. and under a reduced pressure of 0.4 mm. of mercury. A simple, single plate head was used for this final distillation, which required 55 minutes. The distillate weighed 214 grams and was composed, by weight, of 68 percent 9,9'-bifluorylidene, 4 percent fluorene and 21 percent 9,9'-bifluorenyl. The yield of 9,9'-bifluorylidene represented a 50 percent efficiency and a 21 percent conversion, based on fluorene, for this single pass operation of the process. A residue remaining in the flask weighed 143 grams.

*Example II*

A quantity of commercial fluorene, produced from coal tar, and having a melting point temperature of 110–111° C. was crystallized once from acetic acid. A mixture of 1000 grams of this fluorene and 67.4 grams of sulfur was heated for one hour in a flask in a liquid bath maintained at a temperature between 250 to 260° C. The hydrogen sulfide formed was trapped and removed as formed. Fifteen grams of carbon were then introduced into the reaction mixture and the mixture was distilled for 152 minutes at a temperature of 250° C. to 325° C. and under a reduced pressure of 80 millimeters of mercury, using a short packed column. During this period 521 grams of fluorene having a melting point temperature of 103–106° C. were collected as distillate. The temperature of the bath was then raised to 330° C., the pressure was reduced to 8 mm. of mercury, and distillation was continued for one-half hour, during which time 131 grams of distillate were collected. This distillate was composed, by weight of 74 percent fluorene and 26 percent 9,9'-bifluorenyl. A final flash distillation was then made at a bath temperature of 340° C. to 350° C. and under a reduced pressure of 0.45 mm. of mercury. A simple, single plate head was used for this final distillation, which required 74 minutes. The distillate weighed 248 grams and was composed, by weight, of 83 percent 9,9'-bifluorylidene, 9 percent fluorene and 8 percent 9,9'-bifluorenyl. The yield of 9,9'-bifluorylidene represented a 71 percent efficiency and a 25 percent conversion, based on fluorene, for this single pass operation of the process.

*Example III*

A mixture of 1000 grams of commercial fluorene, produced from coal tar and having a melting point temperature of 110–111° C., and 6.06 grams of sulfur was heated for 12 minutes in a flask in a liquid bath maintained at a temperature of 270° C. to 280° C. The reaction product was leached and triturated with boiling isopropanol, giving an 83 percent by weight yield of 9,9'-bifluorylidene having a melting point temperature of 230° C. to 240° C.

*Example IV*

A mixture of 100 grams of commercial fluorene, produced from coal tar and having a melting point temperature of 110–111° C., and 8 grams of sulfur, was stirred and heated for one hour in a flask in a liquid bath maintained at a temperature of 260° C. The reaction product was leached and triturated with boiling isopropanol, giving an 81 percent by weight yield of 9,9'-bifluorylidene.

*Example V*

A quantity of commercial fluorene, produced from coal tar, and having a melting point temperature of 110–111° C. was crystallized once from acetic acid. A mixture of 100 grams of this fluorene and 6.06 grams of sulfur was heated for one hour in a flask in a liquid bath maintained at a temperature of 250° C. The reaction product was leached and triturated with boiling isopropanol, giving an 81 percent by weight yield of 9,9'-bifluorylidene.

*Example VI*

A mixture of 200 grams of 9,9'-bifluorenyl, prepared by the process of this invention and 2 grams of carbon was distilled for one hour at a temperature of 320° C. and under a reduced pressure of 49 to 78 mm. of mercury, in a flask equipped for distillation. Distillate was produced in the amount of 98 grams and was composed, by weight, of 98 percent fluorene, one percent 9,9'-bifluorenyl and one percent 9,9'-bifluorylidene. The reaction mixture was further distilled for 12 minutes at a temperature of 355° C. and under a reduced pressure of 1.2 to 5.8 mm. of mercury. This further distillation yielded 88 grams of distillate which was composed, by weight, of 77 percent 9,9'-bifluorylidene, 6 percent fluorene and 15 percent 9,9'-bifluorenyl. A residue weighing 13 grams remained in the flask.

*Example VII*

A mixture of 200 grams of 9,9'-bifluorenyl prepared by the process of this invention, and 2 grams of carbon was distilled for 23 minutes at a temperature of 350° C. and under a reduced pressure of 50 to 80 mm. of mercury, in a flask equipped for distillation. Distillate was produced in the amount of 113 grams and was composed, by weight, of 77 percent fluorene, 3 percent 9,9'-bifluorenyl and one precent 9,9'-bifluorylidene. The reaction mixture was further distilled for 18 minutes at a temperature of 355° C. and under a reduced pressure of 1.5 to 6.7 mm. of mercury. This further distillation yielded 75.5 grams of distillate which was composed, by weight, of 83 percent 9,9'-bifluorylidene and 8 percent fluorene. A residue weighing 12 grams remained in the flask.

*Example VIII*

Seventeen grams of 9,9'-bifluorenyl prepared by the process of this invention was distilled at a temperature of 354° C. and under a reduced pressure of 62–97 mm. of mercury. Distillate was produced in the amount of 8 grams and was composed predominantly of fluorene with only a trace of 9,9'-bifluorylidene. There remained a residue which weighed 9 grams and which contained 80.4 percent by weight of 9,9'-bifluorylidene.

What is claimed is:

1. Process for the conversion of 9,9'-bifluorenyl to 9,9'-bifluorylidene which comprises heating 9,9'-bifluorenyl in the absence of a catalyst to a reaction temperature above 245° C., whereby said 9,9'-bifluorenyl disproportionates to form 9,9'-bifluorylidene and fluorene.

2. Process for the conversion of 9,9'-bifluorenyl to 9,9'-bifluorylidene which comprises heating 9,9'-bifluorenyl in the absence of a catalyst to a temperature of from 310° C. to 365° C., whereby said 9,9'-bifluorenyl disproportionates to form 9,9'-bifluorylidene and fluorene.

3. Process for the conversion of 9,9'-bifluorenyl to 9,9'-bifluorylidene which comprises heating 9,9'-bifluorenyl in the absence of a catalyst to a temperature of from 320° C. to 340° C., whereby said 9,9'-bifluorenyl disproportionates to form 9,9'-bifluorylidene and fluorene.

4. Process for the conversion of 9,9'-bifluorenyl to 9,9'-bifluorylidene which comprises heating 9,9'-bifluorenyl in the absence of a catalyst to a temperature of from 320° C. to 340° C., whereby said 9,9'-bifluorenyl disproportionates to form 9,9'-bifluorylidene and fluorene and maintaining said temperature until vapors of fluorene are no longer evolved, indicating the end of the disproportionation reaction.

5. Process for the conversion of 9,9'-bifluorenyl to 9,9'-bifluorylidene which comprises heating 9,9-bifluorenyl in the absence of a catalyst to a temperature of from 320° C. to 340° C., whereby said 9,9'-bifluorenyl disproportionates to form 9,9'-bifluorylidene and fluorene collecting the vapors of said fluorene as formed and recovering said fluorene, raising the reaction temperature to about 350° C. after said fluorene vapors are no longer evolved, and collecting and recovering the 9,9'-bifluorylidene obtained as a vapor when the reaction temperature is so raised.

6. Process for the conversion of 9,9'-bifluorenyl to 9,9'-bifluorylidene which comprises mixing inert carbon with 9,9'-bifluorenyl, heating the thus formed mixture in the absence of a catalyst to a temperature of from 320° C. to 340° C., whereby said 9,9'-bifluorenyl disproportionates to form 9,9'-bifluorylidene and fluorene.

7. Process for the conversion of 9,9'-bifluorenyl to 9,9'-bifluorylidene which comprises mixing charcoal with 9,9'-bifluorenyl, heating the thus formed mixture in the absence of a catalyst to a temperature of from 320° C. to 340° C., whereby said 9,9'-bifluorenyl disproportionates to form 9,9'-bifluorylidene and fluorene.

8. Process for the conversion of 9,9'-bifluorenyl to 9,9'-bifluorylidene which comprises mixing charcoal with 9,9'-bifluorenyl, heating the thus formed mixture in the absence of a catalyst to a temperature of from 320° C. to 340° C., whereby said 9,9'-bifluorenyl disproportionates to form 9,9'-bifluorylidene and fluorene, collecting the vapors of said fluorene as formed and recovering said fluorene, raising the reaction temperature to about 350° C. after said fluorene vapors are no longer evolved, and collecting and recovering the 9,9'-bifluorylidene obtained as a vapor when the reaction temperature is so raised.

9. Process for obtaining 9,9'-bifluorylidene from fluorene which comprises mixing fluorene with sulfur in the ratio of from 2.0 to 3.0 mols of fluorene per mol of sulfur, heating the thus formed mixture at a temperature of from 240° C. to 290° C. until said fluorene is converted to 9,9'-bifluorenyl in the absence of a catalyst, heating said 9,9'-bifluorenyl to a temperature of from 310° C. to 365° C., whereby said 9,9'-bifluorenyl disproportionates to form 9,9'-bifluorylidene and fluorene.

10. Process for obtaining 9,9'-bifluorylidene from fluorene which comprises mixing fluorene with sulfur in the ratio of from 2.40 to 2.66 mols of fluorene per mol of sulfur, heating the thus formed mixture at a temperature of from 240° C. to 290° C. until said fluorene is converted to 9,9'-bifluorenyl in the absence of a catalyst, heating said 9,9'-bifluorenyl to a temperature of from 320° C. to 340° C., whereby said 9,9'-bifluorenyl disproportionates to form 9,9'-bifluorylidene and fluorene.

11. Process for obtaining 9,9'-bifluorylidene from fluorene which comprises mixing fluorene with sulfur in the ratio of from 2.40 to 2.66 mols of fluorene per mol of sulfur, heating the thus formed mixture at a temperature of from 240° C. to 290° C. until said fluorene is converted to 9,9'-bifluorenyl in the absence of a catalyst, heating said 9,9'-bifluorenyl to a temperature of from 320° C. to 340° C., whereby said 9,9'-bifluorenyl disproportionates to form 9,9'-bifluorylidene and fluorene and maintaining said temperature until vapors of fluorene from said disproportionation are no longer evolved, indicating the end of the disproportion reaction.

12. Process for obtaining 9,9'-bifluorylidene from fluorene which comprises mixing fluorene with sulfur in the ratio of from 2.40 to 2.66 mols of fluorene per mol of sulfur, heating the thus formed mixture at a temperature of from 240° C. to 290° C. until said fluorene is converted to 9,9'-bifluorenyl in the absence of a catalyst, heating said 9,9'-bifluorenyl to a temperature of from 320° C. to 340° C., whereby said 9,9'-bifluorenyl disproportionates to form 9,9'-bifluorylidene and fluorene, collecting the vapors of fluorene from said disproportionation as formed and recovering fluorene from said disproportionation, raising the reaction tempature to about 350° C. after vapors of fluorene from said disproportionation are not longer evolved, and collecting and recovering the 9,9'-bifluorylidene obtained as a vapor when the reaction temperature is so raised.

13. Process for obtaining 9,9'-bifluorylidene from fluorene which comprises mixing fluorene with sulfur in the ratio of from 2.40 to 2.66 mols of fluorene per mol of sulfur, heating the thus formed mixture at a temperature of from 240° C. to 290° C. until said fluorene is converted to 9,9'-bifluorenyl, mixing inert carbon with said 9,9'-bifluorenyl, to form a second mixture, heating said second mixture in the absence of a catalyst to a temperature of from 320° C. to 340° C., whereby said 9,9'-bifluorenyl disproportionates to form 9,9'-bifluorylidene and fluorene.

14. Process for obtaining 9,9'-fluorylidene from fluorene which comprises mixing fluorene with sulfur in the ratio of from 2.40 to 2.66 mols of fluorene per mol of sulfur, heating the thus formed mixture at a temperature of from 240° C. to 290° C. until said fluorene is converted to 9,9'-bifluorenyl, mixing charcoal with said 9,9'-bifluorenyl to form a second mixture, heating said second mixture in the absence of a catalyst to a reaction temperature of from 320° C. to 340° C., whereby said 9,9'-difluorenyl disproportionates to form 9,9'-bifluorylidene and fluorene.

15. Process for obtaining 9,9'-bifluorylidene from fluorene which comprises mixing fluorene with sulfur in the ratio of from 2.40 to 2.66 mols of fluorene per mol of sulfur, heating the thus formed mixture at a temperature of from 240° C. to 290° C. until said fluorene is converted to 9,9'-bifluorenyl, mixing charcoal with said 9,9'-bifluorenyl to form a second mixture, heating said second mixture in the absence of a catalyst to a reaction temperature of from 320° C. to 340° C., whereby said 9,9'-bifluorenyl disproportionates to form 9,9'-bifluorylidene and fluorene, collecting the vapors of fluorene from said disproportionation as formed and recovering fluorene from said disproportionation, raising the reaction temperature to about 350° C. after vapors of fluorene from said disproportionation are no longer evolved, and collecting and recovering the 9,9'-bifluorylidene obtained as a vapor when the reaction temperature is so raised.

16. In a process for the production of 9,9'-bifluorylidene from fluorene, the improvement which comprises converting the intermediate 9,9'-bifluorenyl, to 9,9'-bifluorylidene by heating said 9,9'-bifluorenyl in the absence of a catalyst to a temperature of from 310° C. to 365° C., whereby said 9,9'-bifluorenyl disporportionates to form 9,9'-bifluorylidene and fluorene.

17. In a process for the production of 9,9'-bifluorylidene from fluorene, the improvement which comprises converting the intermediate 9,9'-bifluorenyl, to 9,9'-bifluorylidene by heating said 9,9'-bifluorenyl in the absence of a catalyst to a temperature of from 320° C. to 340° C., whereby said 9,9'-bifluorenyl disproportionates to form 9,9'-bifluorylidene and fluorene.

18. In a process for the production of 9,9'-bifluorylidene from fluorene, the improvement which comprises converting the intermediate 9,9'-bifluorenyl, to 9,9'-bifluorylidene by heating said 9,9'-bifluorenyl in the absence of a catalyst to a temperature of from 320° C. to 340° C., whereby said 9,9'-bifluorenyl disproportionates to form 9,9'-bifluorylidene and fluorene and maintaining said temperature until vapors of fluorene from said disproportionation are no longer evolved, indicating the end of the disproportionation reaction.

19. In a process for the production of 9,9'-bifluorylidene from fluorene, the improvement which comprises converting the intermediate 9,9'-bifluorenyl to 9,9'-bifluorylidene by heating said 9,9'-bifluorenyl in the absence of a catalyst to a temperature of from 320° C. to 340° C., whereby said 9,9'-bifluorenyl disproportionates to form 9,9'-bifluorylidene and fluorene, collecting the vapors of fluorene from said disproportionation as formed and recovering fluorene from said disproportionation, raising the reaction temperature to about 350° C. after vapors of fluorene from said disproportionation are no longer evolved, and collecting and recovering the 9,9'-bifluorylidene obtained as a vapor when the reaction temperature is so raised.

20. In a process for the production of 9,9'-bifluorylidene from fluorene, the improvement which comprises converting the intermediate 9,9'-bifluorenyl to 9,9'-bifluorylidene by mixing inert carbon with said 9,9'-bifluorenyl and heating the thus formed mixture in the absence of a catalyst to a temperature of from 320° C. to 340° C., whereby said 9,9'-bifluorenyl disproportionates to form 9,9'-bifluorylidene and fluorene.

21. In a process for the production of 9,9'-bifluorylidene from fluorene, the improvement which comprises converting the intermediate 9,9'-bifluorenyl to 9,9'-bifluorylidene by mixing charcoal with said 9,9'-bifluorenyl and heating the thus formed mixture in the absence of a catalyst to a temperature of from 320° C. to 340° C., whereby said 9,9'-bifluorenyl disproportionates to form 9,9'-bifluorylidene and fluorene.

22. In a process for the production of 9,9'-bifluorylidene from fluorene, the improvement which comprises converting the intermediate 9,9'-bifluorenyl to 9,9'-bifluorylidene by mixing charcoal with said 9,9'-bifluorenyl and heating the thus formed mixture in the absence of a catalyst to a temperature of from 320° C. to 340° C. whereby said 9,9'-bifluorenyl disproportionates to form 9,9'-bifluorylidene and fluorene, collecting the vapors and fluorene from said disproportionation as formed and recovering fluorene from said disproportionation, raising the reaction temperature to about 350° C. after vapors of fluorene from said disproportionation are no longer evolved, and collecting and recovering the 9,9'-bifluorylidene obtained as a vapor when the reaction temperature is so raised.

References Cited in the file of this patent

Graebe et al.: Justus Liebig's Annalen der Chemie, vol. 290 (1896), pages 238–246; page 246 only needed.

Boundy et al.: "Styrene, Its Polymers, Copolymers and Derivatives" (New York: Reinhold Pub. Corp., 1952), page 20 only needed.

UNITED STATES PATENT OFFICE
CERTIFICATE OF CORRECTION

Patent No. 2,905,728　　　　　　　　　　　　　　　　　September 22, 1959

Bernard B. Lampert et al.

It is hereby certified that error appears in the printed specification of the above numbered patent requiring correction and that the said Letters Patent should read as corrected below.

Column 2, line 24, for "9,9-bifluorenyl" read — 9,9′-bifluorenyl —; column 3, line 2, and column 4, line 30, for "fluorence", each occurrence, read — fluorene —; column 4, line 71, for "9,9′-difluorylidene" read — 9,9′-bifluorylidene —; column 7, line 24, strike out "in the absence of a catalyst" and insert the same after "heating said 9,9′-bifluorenyl" in line 25, same column; line 33, strike out "in the absence of a catalyst" and insert the same after "heating said 9,9′-bifluorenyl" in line 34, same column; same column 7, line 42, strike out "in the absence of a catalyst" and insert the same after "heating said 9,9′-bifluorenyl" in line 43; column 7, line 48, for "disproportion" read — disproportionation —; lines 54 and 55, strike out "in the absence of a catalyst" and insert the same after "heating said 9,9′-bifluorenyl" in line 55, same column; column 8, line 1, for "9,9′-fluorylidene" read — 9,9′-bifluorylidene —; line 10, for "9,9′-difluorenyl" read — 9,9′-bifluorenyl —.

Signed and sealed this 24th day of May 1960.

(SEAL)
Attest:

KARL H. AXLINE　　　　　　　　　　　　　　　　　　ROBERT C. WATSON
Attesting Officer　　　　　　　　　　　　　　　　　Commissioner of Patents